US012747872B2

(12) United States Patent
Hoertz et al.

(10) Patent No.: US 12,747,872 B2
(45) Date of Patent: Sep. 29, 2026

(54) DEHUMIDIFICATION UNIT AND DESICCANT DRUM THEREIN

(71) Applicant: TRANE INTERNATIONAL INC., Davidson, NC (US)

(72) Inventors: Paul Gerard Hoertz, Hillsborough, NC (US); Charles John Bergh, Berwyn, PA (US); Kenneth J. Schultz, Onalaska, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 888 days.

(21) Appl. No.: 17/929,448

(22) Filed: Sep. 2, 2022

(65) Prior Publication Data

US 2024/0077218 A1 Mar. 7, 2024

(51) Int. Cl.
*F24F 3/14* (2006.01)
*B01D 53/06* (2006.01)
*B01D 53/26* (2006.01)

(52) U.S. Cl.
CPC ............ *F24F 3/1423* (2013.01); *B01D 53/06* (2013.01); *B01D 53/261* (2013.01); (Continued)

(58) Field of Classification Search
CPC ............... F24F 3/1423; F24F 2003/144; F24F 2003/1464; F24F 3/14; F24F 2203/1032; (Continued)

(56) References Cited

U.S. PATENT DOCUMENTS 4,719,761 A 1/1988 Cromer
7,326,277 B1 * 2/2008 Cohen .................. B60T 17/004 96/125

(Continued)

FOREIGN PATENT DOCUMENTS

CN 2300839 Y 12/1998
CN 203408614 U 1/2014

(Continued)

OTHER PUBLICATIONS

Machine Translation of JP 2003074906 A Obtained from Espacenet on Mar. 20, 2025 (Year: 2025).*

*Primary Examiner* — In Suk C Bullock
(74) *Attorney, Agent, or Firm* — HSML P.C.

(57) ABSTRACT

A dehumidifying air handling unit for a heating, ventilation, air conditioning, and refrigeration (HVACR) system includes a housing, a hollow desiccant drum configured to rotate within the housing, and a heat exchanger disposed within the hollow desiccant drum. The hollow desiccant drum includes channels that extend through a sidewall that surrounds an interior space. A desiccant is provided in the channels. The heat exchanger is configured to cool air flowing through the interior space of the hollow desiccant drum. A method of conditioning air includes rotating a hollow desiccant drum within a housing and directing the air to pass through the hollow desiccant drum. The air passing through the hollow desiccant drum includes cooling, with the heat exchanger, the air in an interior space of the hollow desiccant drum, and adsorbing, with a desiccant, moisture from the air cooled by the heat exchanger.

18 Claims, 5 Drawing Sheets

(52) U.S. Cl.
CPC ........ *B01D 53/265* (2013.01); *B01D 2257/80* (2013.01); *B01D 2259/40083* (2013.01); *B01D 2259/4508* (2013.01); *F24F 2003/144* (2013.01); *F24F 2003/1464* (2013.01)

(58) Field of Classification Search
CPC ...... F24F 3/1411; F24F 5/0014; F24F 1/0083; F24F 2203/026; F24F 2203/10; B01D 53/06; B01D 53/261; B01D 53/265; B01D 2257/80; B01D 2259/40083; B01D 2259/4508; B01D 53/26; B01D 53/28; B01D 2253/106; B01D 2253/25; B01D 2253/3425; B01D 53/0407
See application file for complete search history.

(56) References Cited

U.S. PATENT DOCUMENTS

| | | | | |
|---|---|---|---|---|
| 11,592,195 | B2 * | 2/2023 | Pandit | F24F 3/14 |
| 2014/0150651 | A1 * | 6/2014 | Velasco Valcke | B01D 5/0024<br>95/126 |

FOREIGN PATENT DOCUMENTS

| | | | | | |
|---|---|---|---|---|---|
| CN | 103638777 | B | | 2/2016 | |
| CN | 209484741 | U | | 10/2019 | |
| CN | 112963908 | A | | 6/2021 | |
| CN | 113048584 | A | | 6/2021 | |
| JP | 2003074906 | A | * | 3/2003 | F24F 3/1423 |

* cited by examiner

DEHUMIDIFICATION UNIT AND DESICCANT DRUM THEREIN

FIELD

This disclosure relates to dehumidification units and to dehumidification air handling units used in heating, ventilation, air condition, and refrigeration (HVACR) systems.

BACKGROUND

HVACR systems are generally used to heat, cool, and/or ventilate an enclosed space (e.g., an interior space of a commercial building or a residential building, an interior space of a refrigerated transport unit, or the like). The HVACR system can include an air handling unit (AHU) that conditions air for the enclosed space. The AHU can include a housing, fan(s), heat exchanger(s), etc. The AHU can include a desiccant for dehumidifying the air.

BRIEF SUMMARY

In an embodiment, a dehumidifying air handling unit for a heating, ventilation, air conditioning, and refrigeration (HVACR) system includes a housing, a hollow desiccant drum, and a heat exchanger. The housing includes an air inlet and an air outlet. A main airflow path extends through the housing from the air inlet to the air outlet. The hollow desiccant drum is disposed in main airflow path and is configured to rotate within the housing. The hollow desiccant drum includes an interior space, a sidewall that surrounds the interior space, and channels that extend through the sidewall, and a desiccant provided in the channels. The heat exchanger is disposed in the interior space of the desiccant drum. The heat exchanger is configured to cool the air flowing through the interior space of the hollow desiccant drum.

In an embodiment, the main airflow path extends through the sidewall of the hollow desiccant drum at least twice between the air inlet and the air outlet.

In an embodiment, the hollow desiccant drum and the heat exchanger are configured to dehumidify and cool the air in the main flow path as the air passes through the hollow desiccant drum.

In an embodiment, the desiccant is configured to adsorb moisture from the air flowing out of the hollow desiccant drum and to desorb the adsorbed moisture into the air flowing into the hollow desiccant drum.

In an embodiment, the sidewall has a tubular shape.

In an embodiment, the rotation of the hollow desiccant drum within the housing causes the channels to move between being located on a first end of the hollow desiccant drum and a second end of the hollow desiccant drum. The air is configured to flow into the hollow desiccant drum through a set of the channels located on the first side of the hollow desiccant drum and to flow out of the hollow desiccant drum through a set of the channels located on the second side of the hollow desiccant drum.

In an embodiment, the main airflow path extends through the sidewall at least twice without turning more than 45 degrees.

In an embodiment, an axis of rotation of the hollow desiccant drum is at or about perpendicular to the main airflow path.

In an embodiment, a heating, ventilation, air conditioning, and refrigeration (HVACR) system includes a refrigeration circuit configured to cool a working fluid that includes refrigerant and a dehumidifying air handling unit. The dehumidifying air handling unit includes a housing, a hollow desiccant drum, and a heat exchanger. The housing includes an air inlet and an air outlet. A main airflow path extends through the housing from the air inlet to the air outlet. The hollow desiccant drum is disposed in the main airflow path and is configured to rotate within the housing. The hollow desiccant drum includes an interior space, a sidewall that surrounds the interior space, and channels that extend through the sidewall, and a desiccant provided in the channels. The heat exchanger disposed in the interior space of the desiccant drum. The heat exchanger is configured to cool the air flowing through the interior space of the hollow desiccant drum. The heat exchanger uses the working fluid or an intermediate fluid cooled by the working fluid to cool the air.

In an embodiment, the main airflow path extends through the sidewall of the hollow desiccant drum at least twice between the air inlet and the air outlet.

In an embodiment, the hollow desiccant drum and the heat exchanger are configured to dehumidify and cool the air in the main flow path as the air passes through the hollow desiccant drum.

In an embodiment, the desiccant is configured to adsorb moisture from the air flowing out of the hollow desiccant drum and to desorb the adsorbed moisture into the air flowing into the hollow desiccant drum.

In an embodiment, the sidewall has a tubular shape.

In an embodiment, the rotation of the hollow desiccant drum within the housing causes the channels to move between being located on a first end of the hollow desiccant drum and a second end of the hollow desiccant drum. The air is configured to flow into the hollow desiccant drum through a set of the channels located on the first side of the hollow desiccant drum and to flow out of the hollow desiccant drum through a different set of the channels located on the second side of the hollow desiccant drum.

In an embodiment, the main airflow path extends through the sidewall at least twice without turning more than 45 degrees.

In an embodiment, an axis of rotation of the hollow desiccant drum is at or about perpendicular to the main airflow path.

In an embodiment, a method is directed to conditioning air in a dehumidifying air handling unit. The dehumidifying air handling unit includes a housing, a hollow desiccant drum disposed within the housing, and a heat exchanger disposed in an interior space of the desiccant drum. The method includes rotating the hollow desiccant drum relative to the housing. The hollow desiccant drum includes the interior space, a sidewall that surrounds the interior space, channels that extend through the sidewall, and a desiccant provided in the channels. The method also includes directing the air to pass through the hollow desiccant drum. The directing of the air includes directing the air into the interior space of the hollow desiccant drum by passing the air through a first set of the channels in the sidewall in contact with the desiccant, and cooling, with the heat exchanger, the air in the interior space of the hollow desiccant drum. The directing of the air also includes adsorbing, with the desiccant, moisture from the air cooled by the heat exchanger by passing the air cooled by the heat exchanger out of the hollow desiccant drum through a second set of the channels in the sidewall in contact with the desiccant.

In an embodiment, the passing of the air through the first set of the channels in the sidewall in contact with the desiccant includes desorbing the moisture adsorbed by the desiccant into the air passing through the first set of the channels.

BRIEF DESCRIPTION OF THE DRAWINGS

Like reference numbers represent like parts throughout.

DETAILED DESCRIPTION

Figure 1:
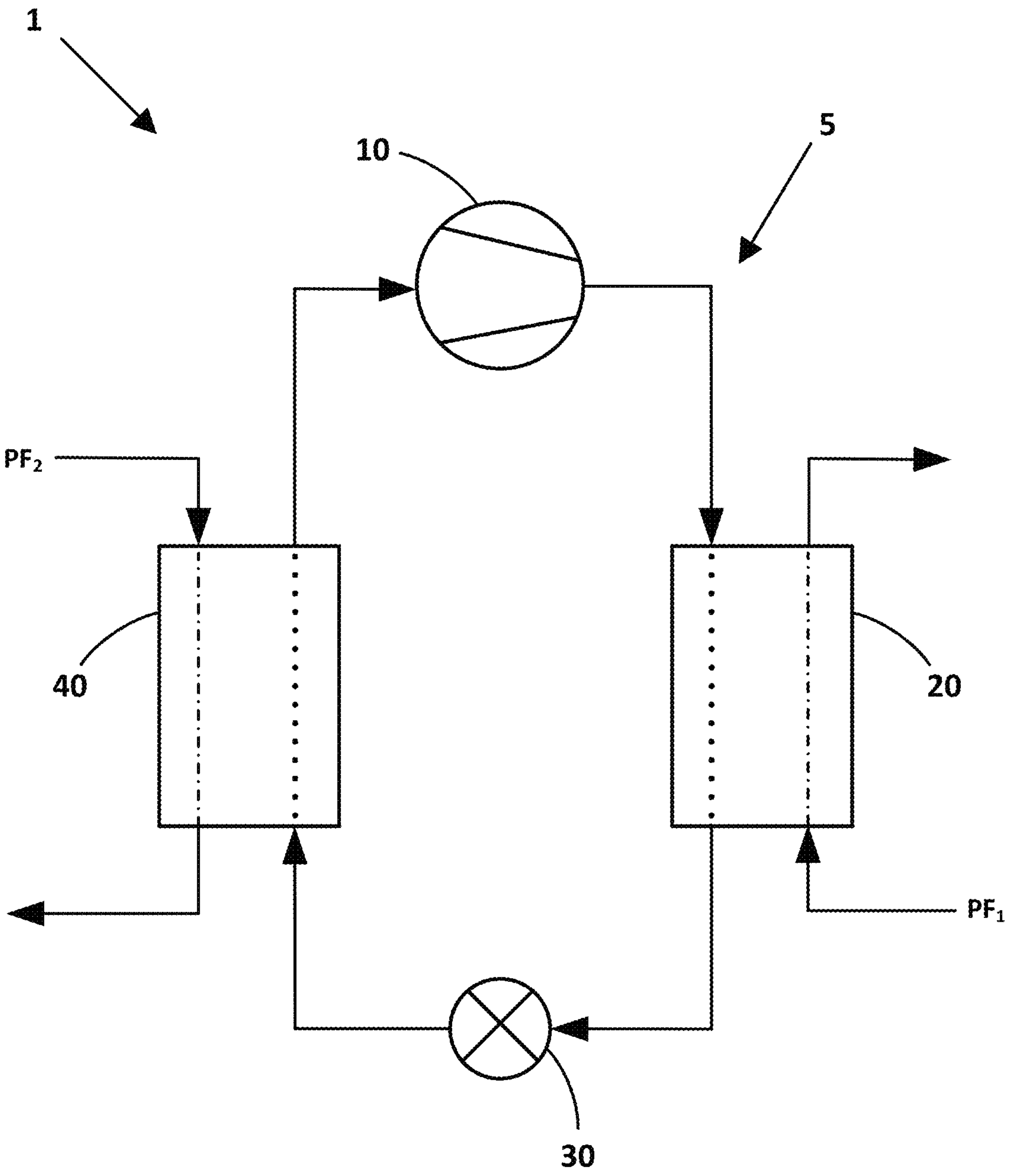
FIG. 1 is a schematic diagram of an embodiment of refrigeration circuit of a HVACR system.

FIG. 1 is a schematic diagram of an embodiment of a refrigeration circuit 5 in a heating, ventilation, air conditioning, and refrigeration (HVACR) system 1. In an embodiment, the HVACR system 1 may be an industrial, commercial, or residential HVACR system 1 configured to condition the inside of a building (e.g., office space, residential house, or the like). In an embodiment, the HVACR system 1 may be a transport HVACR use for cooling the inside of a transport unit (e.g., shipping container, transport/trucking container, reefer, or the like) and/or a passenger vehicle (e.g., a bus, a plane, or the like).

The refrigeration circuit 5 includes a compressor 10, a condenser 20, an expansion device 30, and an evaporator 40. In an embodiment, the refrigeration circuit 5 can be modified to include additional components. For example, the refrigeration circuit 5 in an embodiment can include an economizer heat exchanger, one or more flow control devices, a receiver tank, a dryer, a suction-liquid heat exchanger, or the like. The components of the refrigerant circuit 5 are fluidly connected. Dotted lines and dotted dashed lines are provided in the Figures to indicate fluid flows through some components (e.g., compressor 10, condenser 20, evaporator 40) for clarity, and should be understood as not specifying a specific route within each component.

The refrigerant circuit 5 can be configured as a cooling system (e.g., a fluid chiller of an HVACR, an air conditioning system, or the like) that can be operated in a cooling mode, and/or the refrigerant circuit 5 can be configured to operate as a heat pump system that can run in a cooling mode and a heating mode.

The refrigeration circuit 5 applies known principles of gas compression and heat transfer. The refrigeration circuit can be configured to heat or cool a process fluid (e.g., water, air, or the like). In an embodiment, the refrigeration circuit 5 may represent a chiller that cools a process fluid such as water or the like. In an embodiment, the refrigeration circuit 5 may represent an air conditioner and/or a heat pump that cools and/or heats a process fluid such as air, water, or the like.

During the operation of the refrigeration circuit 5, a working fluid (e.g., refrigerant, refrigerant mixture, or the like) flows into the compressor 10 from the evaporator 40 in a gaseous state at a relatively lower pressure. The compressor 10 compresses the gas into a high pressure state, which also heats the gas. After being compressed, the relatively higher pressure and higher temperature gas flows from the compressor 10 to the condenser 20. In addition to the working fluid flowing through the condenser 20, a first process fluid $PF_1$ (e.g., external air, external water, chiller water, or the like) also separately flows through the condenser 20. The first process fluid absorbs heat from the working fluid as the first process fluid $PF_1$ flows through the condenser 20, which cools the working fluid as it flows through the condenser. The working fluid condenses to liquid and then flows into the expansion device 30. The expansion device 30 allows the working fluid to expand, which converts the working fluid to a mixed vapor and liquid state. An "expansion device" as described herein may also be referred to as an expander. In an embodiment, the expander may be an expansion valve, expansion plate, expansion vessel, orifice, or the like, or other such types of expansion mechanisms. It should be appreciated that the expander may be any type of expander used in the field for expanding a working fluid to cause the gaseous working fluid to decrease in pressure and temperature. The relatively lower temperature, vapor/liquid working fluid then flows into the evaporator 40. A second process fluid $PF_2$ (e.g., air, water, or the like) also flows through the evaporator 40. The working fluid absorbs heat from the second process fluid $PF_2$ as it flows through the evaporator 40, which cools the second process fluid $PF_2$ as it flows through the evaporator 40. As the working fluid absorbs heat, the working fluid evaporates to vapor. The working fluid then returns to the compressor 10 from the evaporator 40. The above-described process continues while the refrigeration circuit 5 is operated, for example, in a cooling mode.

Figure 2:
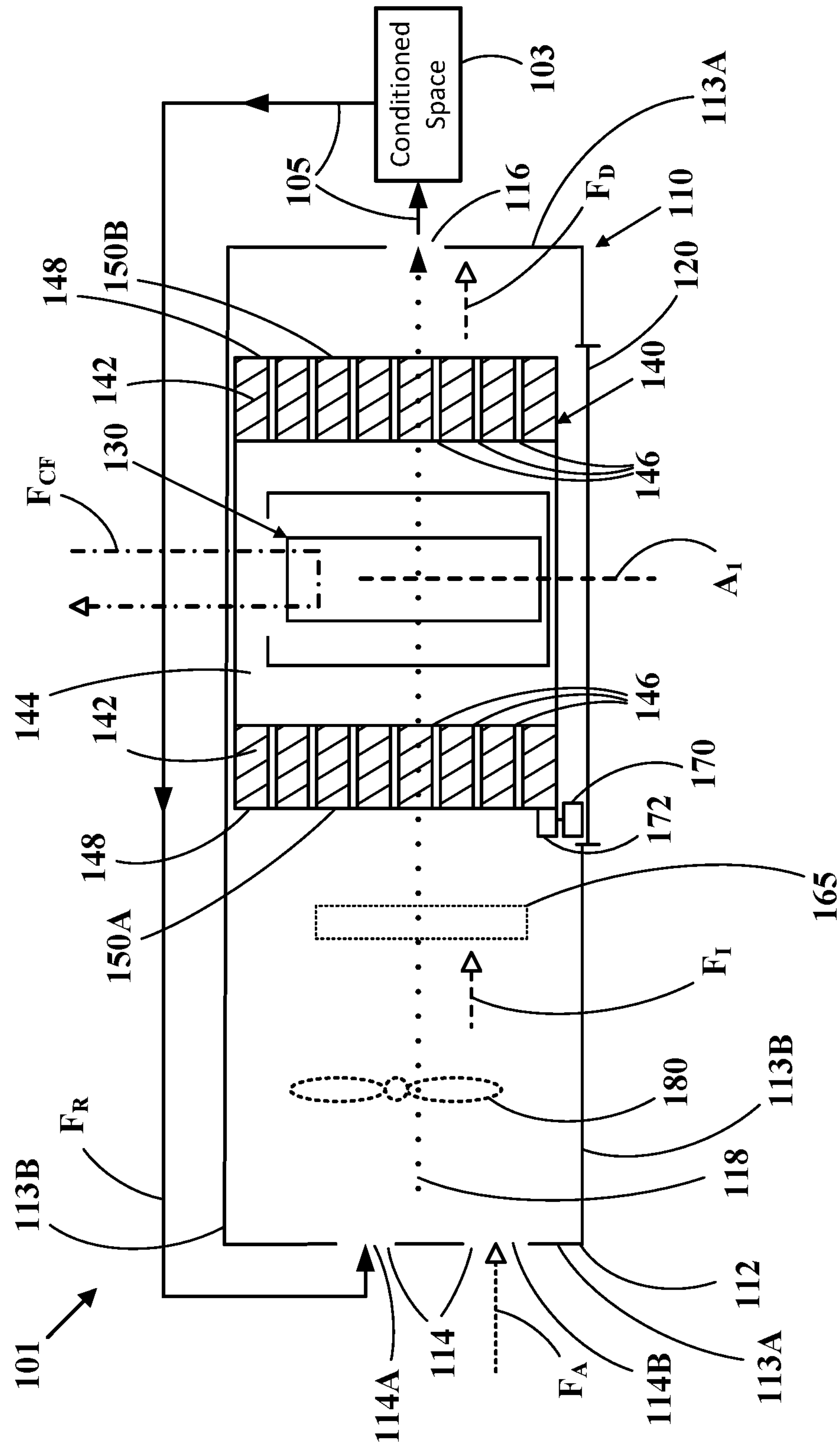
FIG. 2 is a schematic diagram of an embodiment of an air handling unit for an HVACR system.

FIG. 2 is a schematic diagram of an embodiment of a heating, ventilation, air conditioning, and refrigeration ("HVACR") system 101. The HVACR system 101 is configured to condition (e.g., heat, cool, dehumidify, and the like) a conditioned space 103 by supplying conditioned air to the conditioned space 103. FIG. 2 shows a top schematic view of the AHU 110. The HVACR system can include a ductwork ventilation system 105 and an air handling unit ("AHU") 110. The AHU 110 is configured to provide conditioned air that conditions the conditioned space 103. For example, the AHU 110 is configured to discharge conditioned air at a particular temperature (e.g., at a predetermined temperature, within a predetermined temperature range, or the like) and at a particular humidity (e.g., at a predetermined humidity, within a predetermined humidity range, at a particular relative humidity, within a predetermined relative humidity range, or the like). For example, the particular temperature and humidity for the discharged conditioned air may be based on a difference(s) between a current temperature and/or a current humidity of the conditioned space 103 and a desired temperature and/or a desired humidity for the conditioned space 103.

The AHU 110 is connected to the conditioned space 103 by a ductwork ventilation system 105. Conditioned air discharged from the AHU 110 is directed to the conditioned space 103 through the ductwork ventilation system 105. The ductwork ventilation system 105 is configured to distribute the conditioned air discharged from the AHU 110 to the conditioned space 103. In an embodiment, the AHU may be directly connected/vented to the conditioned space 103.

The AHU 110 includes a housing 112 with an air inlet 114 and an air outlet 116. Air enters the AHU 110 through the air inlet 114, is conditioned as it flows through the AHU 110, and the conditioned air is discharged from the air outlet 116. The AHU 110 conditions the air as it flows through the housing 112 from the air inlet 114 to the air outlet 116. The conditioned air flows from the air outlet 116 into the conditioned space 103. As shown in FIG. 2, the ductwork ventilation system 105 can be respectively connected to the air inlet 114 and the air outlet 116 of the AHU 10.

Air enters the AHU 110 through the air inlet 114. The air entering the air handling unit includes a flow of return air $F_R$ from the conditioned space 103 and a flow of ambient air $F_A$(e.g., air from the external environment, outdoor air, or the like). As shown in FIG. 2, the air inlet 114 can include a first air inlet 114A and a second air inlet 114B. For example, the air inlet 114 can be an air inlet section of the AHU 110 that includes the air inlets 114A, 114B of the AHU 110. The first air inlet 114A is a return air inlet which is fluidly connected to the conditioned space 103. Return air $F_R$ from the conditioned space 103 flows into the housing 112 of AHU 110 through the first air inlet 114A. For example, the ductwork ventilation system 105 is connected to the first air inlet 114A. In an embodiment, the second air inlet 114B is an opening, vent, or inlet of the housing 12 that is fluidly connected to the ambient outside environment (e.g., the outside of a building, the external outdoor environment, and the like). Ambient air $F_A$ flows into the AHU 110 through the second air inlet 114B.

The AHU 110 and the HVACR system 101 can have a mixed air configuration in which the AHU 110 conditions a combination of return air $F_R$ and ambient air $F_A$ (e.g., the inlet air $F_I$ is a mixture of return air $F_R$ and ambient air $F_A$). For example, inlet air $F_I$ can contain a greater amount of return air $F_R$ than ambient air $F_A$ (e.g., the mixture containing at or about 5 vol % of the ambient air $F_A$, at or about 10 vol % of the ambient air $F_A$). In an embodiment, the AHU 110 and the HVACR system 101 may have a no air recycle configuration in which the AHU 110 does not utilize any return air $F_R$ (e.g., the inlet air $F_I$ is 100% ambient air $F_{A1}$). For example, the AHU 110 in the no air recycle configuration may block the first air inlet 114A for the return air $F_R$. Each of the mixed air configuration and the no air recycle configuration may be utilized by the HVACR 1 in any of its various modes (e.g., heating mode, cooling mode, and the like).

The AHU 110 includes a cooling heat exchanger 130 and a hollow desiccant drum 140 that are disposed within the housing 112. The inlet air $F_I$ flows through the desiccant drum 140 and the cooling heat exchanger 130 as the air $F_I$ flows from the air inlet 114 to the air outlet 116 within the housing 112. The AHU 110 can also include one or more fan(s) 180 that blow and direct air through the housing 112. As shown in FIG. 2, a fan 180 can be disposed within the housing 112 as one example.

In an embodiment, the AHU 110 has a cooling mode. In the cooling mode, air enters the housing 112 of the AHU, is cooled and dehumidified within the AHU 110, and the cooled and dehumidified air $F_D$ is then discharged from the housing 112 to the conditioned space 103. In the cooling mode, the heat exchanger 130 is a cooling heat exchanger which cools the air and the desiccant drum 140 dehumidifies the air.

In an embodiment, the AHU 110 may include a heater 165 (e.g., an electric heater, a combustion heater, or the like) for heating the air before it passes through the desiccant drum 140. The heater 165 can be used to improve the effectiveness of the desorption of the water from the desiccant into the air. For example, the heater 165 may be used when the air to be conditioned by the AHU 110 has a relatively high humidity.

The AHU 110 has a main airflow path 118 that extends through the housing 112 from the air inlet 114 to the air outlet 116. Air entering the AHU 110 (e.g., the inlet air $F_I$) flows from the air inlet 114 to the air outlet 116 by traveling through the main airflow path 118. In an embodiment for a cooling mode, the air $F_I$ is dehumidified and cooled as it flows through the main airflow path 118.

Figure 3:
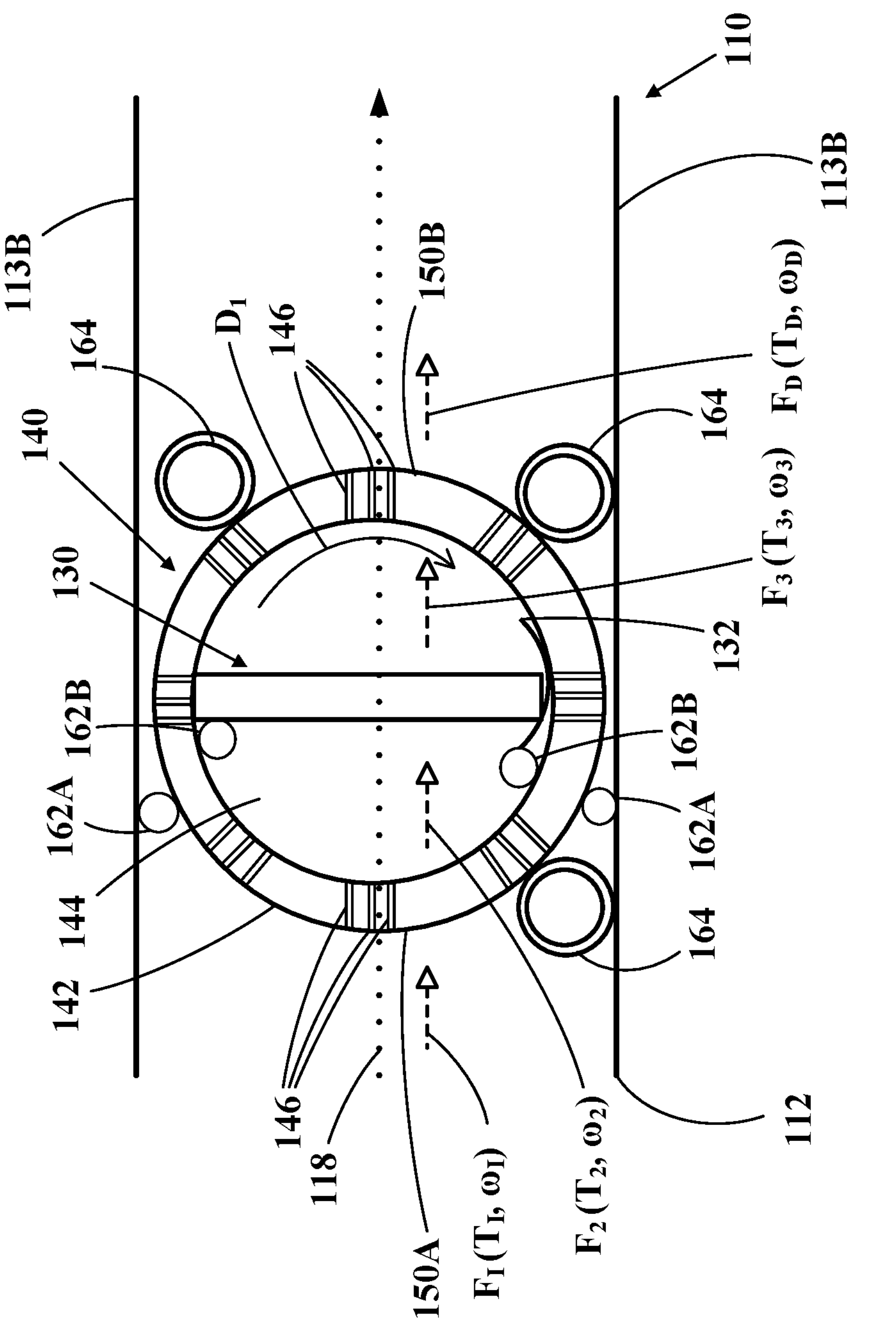
FIG. 3 is a side schematic diagram of a desiccant drum in the air handling unit in FIG. 2, according to an embodiment.

The desiccant drum 140 is disposed in the main airflow path 118 within the housing 110. The desiccant drum 140 is configured to rotate within the housing 110. For example, the desiccant drum 140 can be rotate around a longitudinal axis $A_1$. The rotation axis of the desiccant drum 140 (e.g., longitudinal axis $A_1$) is at or about perpendicular to the main airflow path 118. As shown in FIGS. 2 and 3, the rotational axis of the desiccant drum 140 is horizontal (e.g., axis $A_1$ extends parallel to the paper in FIG. 2 and into the paper in FIG. 3). In an embodiment, the rotational axis of the desiccant drum 140 may be vertical (e.g., axis $A_1$ extending into the paper in FIG. 2 and up and down in FIG. 3).

As one example on how the desiccant drum 140 can be rotated, the AHU 110 includes one or more motors 170 that are configured to rotate the desiccant drum 140 within the housing 110. In the illustrated embodiment, the motor(s) 170 drive one or more wheels 172 in contact with the desiccant drum 140, which rotates the desiccant drum 140.

In another embodiment, a driveshaft (not shown) as another example, may extend along the longitudinal axis $A_1$ of the desiccant drum 140 and be connected to the desiccant drum 140, and the motor(s) 170 may drive/rotate the drive-shaft to rotate the desiccant wheel 140.

In another embodiment, the motor(s) 170 may have a pulley as another example, that drives a belt (not shown) that encircles the desiccant drum 140 to rotate the desiccant drum 140.

It will be appreciated that the movement or rotation of the desiccant drum 140 may be structured and configured in various ways to accomplish the rotation without being limited to the specific structure and configuration shown in FIGS. 2 and 3.

Figure 4:
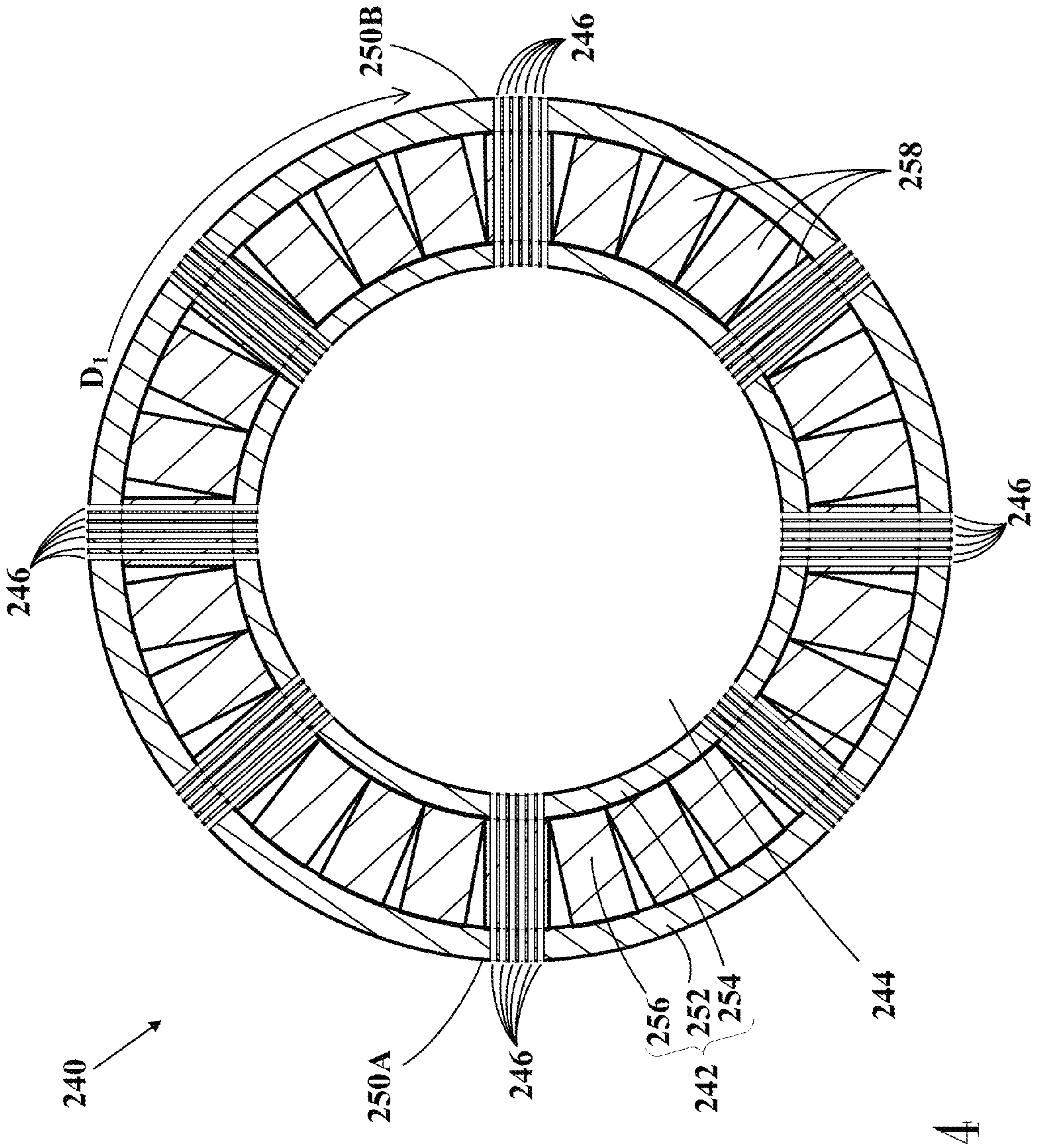
FIG. 4 is a radial cross sectional view of an embodiment of a desiccant drum.

The desiccant drum 140 is hollow and includes a sidewall 142 and an interior space 144. The sidewall 142 surrounds the interior space 144. In one example, the sidewall 142 has a tubular shape. The desiccant drum 140 includes channels 146 that extend through the sidewall 142 of the desiccant drum 140. Each of the channels 146 extends from the exterior 148 of the sidewall 142 to the interior space 144 of the desiccant drum 140. A desiccant drum includes a large number of the channels 146. For example, a desiccant drum 146 can include hundreds or thousands of the channels 146 (e.g., at least one hundred channels, at least one thousand channels). The channels 146 allow for air to pass from outside of the desiccant drum 140 to the inside of the desiccant drum 140 and to then pass from inside the desiccant drum 140 to outside of the desiccant drum. Only a small number of the channels in the desiccant drum 146 are shown in FIGS. 3 and 4 for illustration purposes.

During operation, the desiccant drum 140 rotates within the housing 110. As the desiccant drum 140 rotates, the channels 146 rotate along with the rotation of the desiccant drum 140 such that each channel 146 is recurringly moved between being disposed at a first side 150A of the desiccant drum 140 and a second side 150B of the desiccant drum 140. For example, when viewed along the rotational axis $A_1$ of the desiccant drum 140 (e.g., along the axis $A_1$), the first side 150A can be the left side/wall of the desiccant drum 140 and the second side 150B can be the right side/wall of the drum (e.g., as shown in FIG. 2). The first side 150A and the second side 150B are opposite ends of the desiccant drum 140. For example, a rotation of the desiccant drum 140 can move the channels 146 disposed at the first side 150A (e.g., left side in FIG. 2) to move into the page in FIG. 2 and the channels 146 in the second end 150B move out of the page in FIG. 2.

The air in the main airflow path 118 passes through the desiccant drum 140 by passing through the channels 146. The air flows into the interior space 144 of the desiccant drum 140 by passing through the channels 146 disposed at the first end 150A and flows out of the desiccant drum 140 by passing through a different set of the channels 146 currently disposed at the second end 150B.

The desiccant drum 140 includes a desiccant. A desiccant can be used in the form of a coating applied to surfaces of the desiccant drum 140. In an embodiment, the coating is applied to the surfaces/sides of the channels 146 of the desiccant drum 140 (e.g., a resin coating containing the desiccant applied to surfaces/sides of the channels 146 in the desiccant drum 140). In an embodiment, the desiccant (e.g., desiccant particles) may be homogenously incorporated into the material forming the channels 146. In an embodiment, desiccant drum 140 can have drum segments that are packed beds of desiccant particles, in which the channels 146 are channels that extend through the packed bed. The air flows across the desiccant as it flows through the channels 146 in the desiccant drum.

The desiccant in the desiccant drum 140 is configured to switch between desorbing water and absorbing water as the desiccant is rotated in the desiccant drum 140. Exposure of a desiccant to a flow of air that causes water desorption from the desiccant into the air (e.g., the air extracts water from the desiccant, the adsorbed water in the desiccant is desorbed into the air) can also be referred to as regenerating the desiccant. In the desiccant drum 140, the desiccant is configured to desorb water into the air when disposed in the first end 150A of the desiccant drum 140 and to adsorb water from the air when disposed in the second end 150B of the desiccant drum 140. The water adsorbed when disposed in the second end 150B is desorbed into the air when the desiccant is disposed in the first end 150A.

The cooling heat exchanger 130 is disposed in the main airflow path 118 within the desiccant drum 140. The cooling heat exchanger 130 is disposed in the interior space 144 of the desiccant drum 140. The cooling heat exchanger 130 is disposed within the desiccant drum between the first end 150A and the second end 150B of the desiccant drum 140. The air in the main air flow path 118 passes through the cooling heat exchanger 130 to pass through the desiccant drum 140. For example, the air flowing in through the first end 150A (through the channels 146 currently positioned at the first end 150A) is forced to flow through the cooling heat exchanger 130 to reach the second end 150B and to flow out of the desiccant drum 140 (through the channels 146 currently positioned at the second end 150B). Thus, the air flows through the desiccant drum 140 by flowing through a portion of the sidewall 142 at first end 150A (e.g., through the channels 146 in the sidewall 142 currently disposed at the first end 150A), flowing through the cooling heat exchanger 130, and then through a portion of the sidewall 142 at the second end 150B (e.g., through the channels 146 in the sidewall 142 currently disposed at the second end 150B).

The heat exchanger 130 is attached to the housing 112 of the AHU 110 such that the heat exchanger 130 stays in a fixed position relative to the housing 112. The housing 112 can include a service panel 120 that can be opened to access cooling heat exchanger 130 and the desiccant drum 140. The heat exchanger 130 can be configured to stay in its fixed position when the housing 112 is opened (e.g., when the service panel 120 in the housing 112 is opened for servicing the heat exchanger 130 and/or the desiccant drum 140). For example, the heat exchanger 130 is configured to remain in position within the housing 112 when the desiccant drum 140 is removed for servicing and/or replacement.

FIG. 3 is schematic side view of the desiccant drum 140 in the AHU 110. The desiccant drum 140 rotates in circumferential direction $D_1$. The air (e.g., inlet air $F_I$) in the airflow path flows into the desiccant drum 140. For example, the inlet air $F_I$ is at a (first) temperature $T_I$ and has a (first) humidity ratio co. The air passes through the channels 146 in the first end 150A and adsorbed water in the desiccant is desorbed into the air (e.g., inlet air $F_I$) passing through the channels 146 in the first end 150A. This regenerates the desiccant in the channels 146. For example, the air is humidified from a first humidity ratio co to a higher humidity ratio $\omega_2$. The more humid air $F_2$ is then discharged into the interior space 144.

As shown in FIG. 3, the air in the airflow path 118 flows through the interior space 144 of the desiccant drum 140 (e.g., from the first end 150A to the second end 150B of the desiccant drum 140). Within the interior space 144, the more humid air $F_2$ is discharged from the set of channels 146 in the first end 150A then passes through the cooling heat exchanger 130 and is cooled by the cooling heat exchanger 130. The air $F_2$ passes through the cooling heat exchanger 130 as it passes through the interior space 144 (e.g., from the first end 150A to the second end 150B of the desiccant drum 140). The air $F_2$ passes through the cooling heat exchanger 130 (e.g., flows over/across the surface area (e.g. coils as one example) of the cooling heat exchanger 130) and is cooled by the heat exchanger 130. For example, the air is cooled from a (second) temperature $T_2$ to a lower temperature $T_3$ as it flows through the cooling heat exchanger 130.

A cooling fluid $F_{CF}$ also flows through the heat exchanger 130 separate from the air. The air and the cooling fluid $F_{CF}$ as they separately flow through the heat exchanger 130 exchange heat without physically mixing. The cooling fluid $F_{CF}$ absorbs heat from the air $F_2$, which cools the air. The cooling fluid $F_{CF}$ is cooled by a refrigeration circuit of the HVACR system 101 (e.g., refrigeration circuit 5 in FIG. 1). In an embodiment, the cooling fluid $F_{CF}$ may be the working fluid of the refrigeration circuit. For example, the cooling heat exchanger 130 can be an evaporator of the refrigeration circuit (e.g., evaporator 40 in FIG. 1). In another embodiment, the cooling fluid $F_{CF}$ may be an intermediate fluid (e.g., water, chiller fluid, or the like) that is cooled by the working fluid (e.g., in the evaporator 40 in FIG. 1), and in the cooling heat exchanger 130, the intermediate fluid cooling the air flowing through the cooling heat exchanger 130. As shown in FIG. 2, the piping for supplying the cooling fluid $F_{CF}$ to and from the heat exchanger 130 can extend from the desiccant drum 140 parallel to the rotational axis $A_1$ of the desiccant drum 140.

The cooling of the humid air $F_2$ in the heat exchanger 130 also causes a portion of the moisture in the air $F_2$ to condensate on/within the heat exchanger 130, which partially dehumidifies the air. The AHU 110 can include a drip tray 132 for the heat exchanger 130. The condensate on the heat exchanger drips into the drip tray 132 and is then drained from the AHU 110. This also partially dehumidifies the air. The air $F_3$ discharged from the heat exchanger 130 has a temperature $T_3$ and a humidity ratio $\omega_3$ that are lower than the temperature $T_2$ and the humidity ratio $\omega_2$ of the air $F_2$ flowing into the heat exchanger 130.

The cooled, partially dehumidified air $F_3$ then flows from the heat exchanger 130 through the channels 146 in the second end 150B of the desiccant drum 140. The desiccant adsorbs moisture from the air $F_3$ as it passes through the channels 146 in the second end 150B of the desiccant drum 140. For example, the air $F_D$ is discharged from the desiccant drum 140 having a humidity ratio $\omega_D$ that is lower than the humidity ratio co of the inlet air $F_I$ and is lower than the humidity ratios $\omega_2$, $\omega_3$ of the air $F_2$, $F_3$ flowing within the desiccant drum 140. The air may also be warmed slightly by the material of the desiccant drum 140 as the air flows through the channels 146 in the second end 150B of the desiccant drum 140 (e.g., heated/increased to temperature $T_D$, which is significantly lower than temperatures $T_2$ and $T_I$ and slightly higher than temperature $T_3$). Cooled, (further) dehumidified air $F_D$ is then discharged from the desiccant drum 150B (e.g., from the set of channels 146 in the second end 150B of the desiccant drum 150B).

As shown in FIG. 3, the AHU 110 may in some examples, include one or more seals 162A, 162B configured to prevent the air from flowing around the desiccant drum 140 and/or the cooling heat exchanger 130. The AHU 110 can include one or more seals 162A disposed between the desiccant drum 140 and the housing 112 (e.g., external to the desiccant drum 140) that are configured to prevent air from the circumventing the desiccant drum 140 when flowing from the inlet to the 114 to the outlet 116 (e.g., prevent the air from flowing around the desiccant drum 140 instead of flowing through the desiccant drum 140). The AHU 110 can also include one or more seals 162B disposed inside the desiccant drum 140 (e.g., between the sidewall 144 of the desiccant drum 140 and the cooling heat exchanger 130) that are configured to prevent the air from circumventing the cooling heat exchanger 130 when flowing through the desiccant drum 140 (e.g., prevent the air from flowing from the channels 146 in the first end 150A to the channels 146 in the second end 150B without passing through the cooling heat exchanger 130).

As shown in FIG. 3, the AHU 110 can include one or more supports 164 for the desiccant drum 140. The support(s) 164 are configured to rotatably support the desiccant drum 140 within the housing 112. For example, the support(s) 164 can hold the desiccant drum 140 in position within the housing 112 while still allowing the desiccant drum 140 to rotate relative to the housing 112. As shown in FIG. 3, the support(s) 164 in an embodiment, can be rotatable wheels that support the desiccant drum 140 while allowing it to freely rotate within the housing 112. The support(s) 164 are configured to allow for removal of the desiccant drum 140 from the housing 112 through the opening of the service panel 120 (e.g., allow for sliding out of the desiccant drum 140 through the opening covered by the service panel 120).

In the illustrated embodiment, the desiccant drum 140 has a hollow cylindrical shape with the sidewall 142 having a cylindrical tubular shape. In an embodiment, the tubular shape of the sidewall 142 may be a different shape from a circular shape, such as (but not limited to), a rectangular shape, rounded rectangular shape, an oval shape, a stadium shape, or the like. It should be appreciated that the desiccant drum 140 and its sidewall 142 in other embodiments may have a different rotatable hollow/tubular shape than those listed. The axial ends of the desiccant drum 140 and its sidewall 142 may be open or capped.

The main airflow path 118 is generally straight. As shown in FIG. 2, the main airflow path 118 does not bend (e.g., does not have significant curves or bends). For example, the main airflow path 118 does not turn by more than 90 degrees when traveling from the air inlet 114 to the discharge outlet 116. In FIG. 2, the air inlet 114 and the air discharge 116 are provided in opposite endwalls 113A of the housing 112. In an embodiment, the air inlet 114 and/or the discharge outlet 116 may be located in a sidewall 113B of the housing 114. In such a configuration, the main airflow path 118 that extends from air inlet 114 to the air discharge 116 is still straight.

The main airflow path 118 passes through the sidewall 142 of the desiccant drum 140 at least twice between the air inlet 114 and the air discharge 116. For example, main airflow path 118 extends through the sidewall 142 at least twice (e.g., extends through the sidewall 142 into the desiccant drum 140 and extends through the sidewall 142 out of the desiccant drum 140) while not turning by more than 45 degrees as shown in FIG. 2. In an embodiment, main airflow path 118 extends through the sidewall at least twice while not turning by more than 90 degrees. In an embodiment, main airflow path 118 extends through the sidewall at least twice while not turning by more than 120 degrees. In an embodiment, main airflow path 118 extends through the sidewall at least twice while not turning less than 180 degrees. This can advantageously allow the AHU 110 to have a compact size relative to other conventional dehumidifying and/or air handling units (e.g., that employ a desiccant wheel that uses an air flow path to turn 180°, utilizes multiple airflow paths, etc.).

FIG. 4 is a radial cross-sectional view of an embodiment of a desiccant drum 240. For example, the radial cross-sectional view bisects the desiccant drum 240 (e.g., along a plane extending parallel to the line indicating the main flow path 118 in FIG. 2). As similarly discussed with respect to the desiccant drum 140 in FIGS. 2-3, the desiccant drum 240 includes a sidewall 242, an interior space 244, and channels 246 that extend through the sidewall 242 to the interior space 244. The desiccant drum 240 is configured to be rotated during use (e.g., in circumferential direction $D_1$). Air enters the desiccant wheel 240 through the channels 246 currently positioned in a first end 250A of the desiccant wheel, and the air exits the desiccant wheel 240 through other channels 246 currently positioned in a second end 250B of the desiccant wheel 240.

FIG. 4 only illustrates a small number of the channels 246 in the desiccant drum 240. The desiccant drum 240 includes a large number of the channels 146. For example, a desiccant drum 146 can include hundreds or thousands of the channels 146 (e.g., at least one hundred channels, at least one thousand channels). FIG. 4 only illustrates a small number of the channels 246 in the desiccant drum 240 for illustrated purposes (e.g., only illustrate the channels 246 in eight of the sections 258 in FIG. 4). For example, the channels 246 are provided along at or about the entire perimeter of the desiccant drum 240. For example, the channels 246 are provided in each of the sections 258 in FIG. 4.

The sidewall 242 includes an outer support frame 252, an inner support frame 254, and a desiccant portion 256 disposed between the outer support frame 252 and the inner support frame 254. The desiccant is disposed in the desiccant portion 256. The desiccant portion 256 is formed of the desiccant provided on a porous support material. The desiccant may be provided on the support material (e.g., provided as a coating on surface(s) of the support material) and/or in the support material (e.g., impregnated in the porous support material, a porous support material formed of a material that includes the desiccant).

In an embodiment, the desiccant portion 256 may be stacked desiccant paper. Desiccant-layer paper is generally well known in the field of dehumidifiers. For example, desiccant-layer paper in an embodiment may be a paper sheet that is coated and/or contains desiccant in the paper material itself. At least alternating layers of the desiccant paper in the stack are corrugated (e.g., alternating layers of flat sheets of paper and corrugated sheets of paper, alternating layers of sheets of paper having minor corrugation and major corrugation, and the like) which forms the channels between the adjacent layers of paper.

In an embodiment, the desiccant portion 256 may be a metal foam onto/into which the desiccant is applied. For example, the desiccant is provided/coated on the surfaces of the open structures (e.g., pores, tunnels, and the like) that extend through the metal foam. The desiccant may be integrated into the metal foam in a manner known in the art such as, but not limited to, dip-coating, electrophoretic deposition, brush deposition, spray deposition, electrospray, using an adhesive (e.g., a silicate adhesive or the like), or the like. The desiccant may be, alternatively or additionally, integrated into the metal foam by being provided in the metal/material of the metal foam itself (e.g., the metal/metal composition that forms the metal foam includes the desiccant).

In an embodiment, the desiccant portion 256 may be a plastic foam onto/into which the desiccant is applied. For example, the desiccant can be provided/coated on the inner surfaces of the pores that extend through the plastic foam. For example, the desiccant can be provided/coated on the surfaces of the open structures (e.g., pores, tunnels, and the like) that extend through the plastic foam. The desiccant may be integrated into the plastic foam in a manner known in the art such as, but not limited to, dip-coating, electrophoretic deposition, brush deposition, spray deposition, electrospray, using an adhesive (e.g., a silicate adhesive or the like), or the like. The desiccant may be, alternatively or additionally, integrated into the plastic foam by being provided in plastic foam itself (e.g., the plastic composition that forms the plastic foam includes the desiccant). The plastic composition of the plastic foam may be a composite of plastic and one or more other materials (e.g., carbon composite, or the like).

In an embodiment, the desiccant portion 256 may be a porous 3D honeycomb material onto/into which the desiccant is applied. For example, the porous 3D honeycomb material may be a 3D printed metal material or a 3D printed plastic material. For example, the desiccant is provided/coated on the inner surfaces of the pores/channels that extend through the 3D honeycomb. The channels extending through the 3D honeycomb may extend parallel to each other (e.g., all of the channels extending in the same direction through the 3D honeycomb material). The desiccant may be integrated into the porous 3D honeycomb material in a manner known in the art such as, but not limited to, as discussed above for a plastic foam and/or a metal foam. The desiccant may be, alternatively or additionally, integrated into the porous 3D honeycomb material by being provided in the honeycomb material itself (e.g., the material/composition that forms the porous 3D honeycomb includes the desiccant).

The channels/pores in material of the desiccant portion 256 may be configured to allow for adequate flow of air through the desiccant drum 240 while having adequate surface for interaction between the desiccant and the air flowing through the desiccant drum 240. For example, the desiccant portion 256 may have a relatively small pores, relatively larger pores, or a distribution of small pores and large pores to achieve the desired balance between a pressure drop across the desiccant drum 240 and surface area of desiccant that interacts with the air.

In an embodiment, support frames 252, 254 can be a perforated material onto which the desiccant portion 256 is attached. In the illustrated embodiments, the support frame 252, 254 is a perforated rigid sheet (e.g., perforated metal sheet, perforated rigid plastic sheet, or the like). In FIG. 4, the desiccant drum 240 includes the inner support frame 252 and the outer support frame 254. In another embodiment, the desiccant drum 240 may include just a single support frame 252, 254. For example, the desiccant drum 240 in an embodiment may include just the inner support frame 252 in which the desiccant portion 256 being an outermost layer/surface of the desiccant drum 240.

The desiccant portion 256 may be formed in a variety of ways. The desiccant portion 256 may be formed by cutting block(s) of the porous support material into the desired shape for the desiccant drum 240. The desiccant may be incorporated into porous material before the cutting/shaping (e.g., cutting desiccant coated/containing porous material) and/or after the cutting/shaping (e.g., cutting the porous material then applying/coating desiccant to the pores/channels of the porous material). The desiccant portion 256 can be formed to prevent flow through the desiccant portion 256 that would by-pass flow into and then out of the interior space of the desiccant drum and passing through the cooling heat exchanger (e.g., flowing through the sidewall 242 without passing into the interior space 244).

As shown in FIG. 4, the desiccant portion 256 may be formed of a plurality of individual perimeter/arc sections 258 that are attached to the outer support frame 252 and/or an inner support frame 254 to form the desiccant portion 256. In an embodiment, each section 258 can be cut out from a continuous block of the porous material. In another embodiment, wedges of porous material that has parallel pores/channels (e.g., desiccant loaded paper) may be put together to form a block/cylinder such that the parallel pores/channels extend at or about radially in each wedge. The block/cylinder of wedges is then hollowed out (i.e., its core removed) to form the sections 258. The hollowing shapes each of the wedges into a respective one of the sections 258. Each of the sections 258 having pores/channels that extend at or about radially outward in desiccant portion 256 (e.g., the portion of channels 246 formed in the desiccant layer 256 in FIG. 4). The use of the perimeter/arc sections 258 can ensure the channels 246 each extend at or about radially outward (e.g., radially outward, less than 15 degrees different from radially outward) along the entire parameter/circumference of the desiccant drum 240.

In an embodiment, the desiccant portion 256 may be formed of a single piece of material cut from a block of the porous support material. For example, the desiccant portion 256 may be a single piece when the porous support material has pores/channels that extend along in multiple directions through the porous support material (e.g., a plastic foam, metal foam, or the like). This structure for the pores/channels can allow for channels 246 that radially extend through the desiccant portion 256 (e.g., from an outer side to the inner side of the desiccant portion 256) while maintaining a generally consistent size, such that the flow through the sidewall 242 is remains at or about constant (e.g., less than 10% change) while the desiccant drum 240 rotates.

In an embodiment, the hollow shape of the desiccant portion 256 may be formed of hollowed disks that are attached to the outer support frame 252 and/or an inner support frame 254 in a stack (e.g., stacked along the longitudinal axis, stacked along the length of the desiccant drum 240) to form the desiccant portion 256. For example, the stack of hollowed disks attached to the frame(s) 252, 254 can form the hollow cylinder shape of the desiccant portion 256. Each hollow disk can be formed of perimeter/arc sections 258 (e.g., when the porous material has parallel pores/channels). Each section 258 may be formed from a block of the porous material or from a block of wedges of porous material, as similarly discussed above. In an embodiment, a hollow disk may be a single piece cut from a block of the porous material. The desiccant portion 256 may include spacers (not shown) in between the hollowed disks.

In another embodiment, the desiccant portion 256 may be formed of a desiccant coated/containing flexible porous support material (e.g., a desiccant loaded paper, a desiccant coated flexible plastic foam, or the like) wrapped around the (inner) support frame 254. The flexible porous support material is configured to flex such that its channels/pores (e.g., the portion of channels 246 formed in the desiccant portion 256 in FIG. 4) remain adequately open when the porous support material is wrapped/bent around the support frame 254. In an embodiment, the desiccant coated/containing flexible porous support material may be a desiccant loaded paper formed of alternating shallow corrugated layers and deeply corrugated layers. For example, the corrugations being in the same period in the shallow and deep corrugated layers (e.g., each channel is defined by a deep corrugation and a shallow corrugation in the loaded paper). The configuration of the shallow corrugations and deep corrugations allow the channels to remain adequately open when the desiccant loaded paper is wrapped/flexed around the support frame 254 (e.g., wrapped into a tubular shape).

In an embodiment, the support frame(s) 252 may be in the form of a porous belt. In an embodiment, the desiccant portion 256 can be formed of the sections 258 that are each separately attached to the porous belt, which allows for the desiccant portion 256 be flexible and bend with the movement of the porous belt. In an embodiment, the desiccant portion 256 may be in the form of a desiccant coating applied to a fabric material and/or a flexible porous substrate of porous belt. The porous belt can be formed of porous woven fabric, a porous non-woven fabric, and/or a porous layered fabric. For example, the desiccant portion 256 may be in the form of a desiccant coating applied to the porous woven fabric, porous non-woven fabric, or on another fabric layer of the porous belt.

Figure 5:
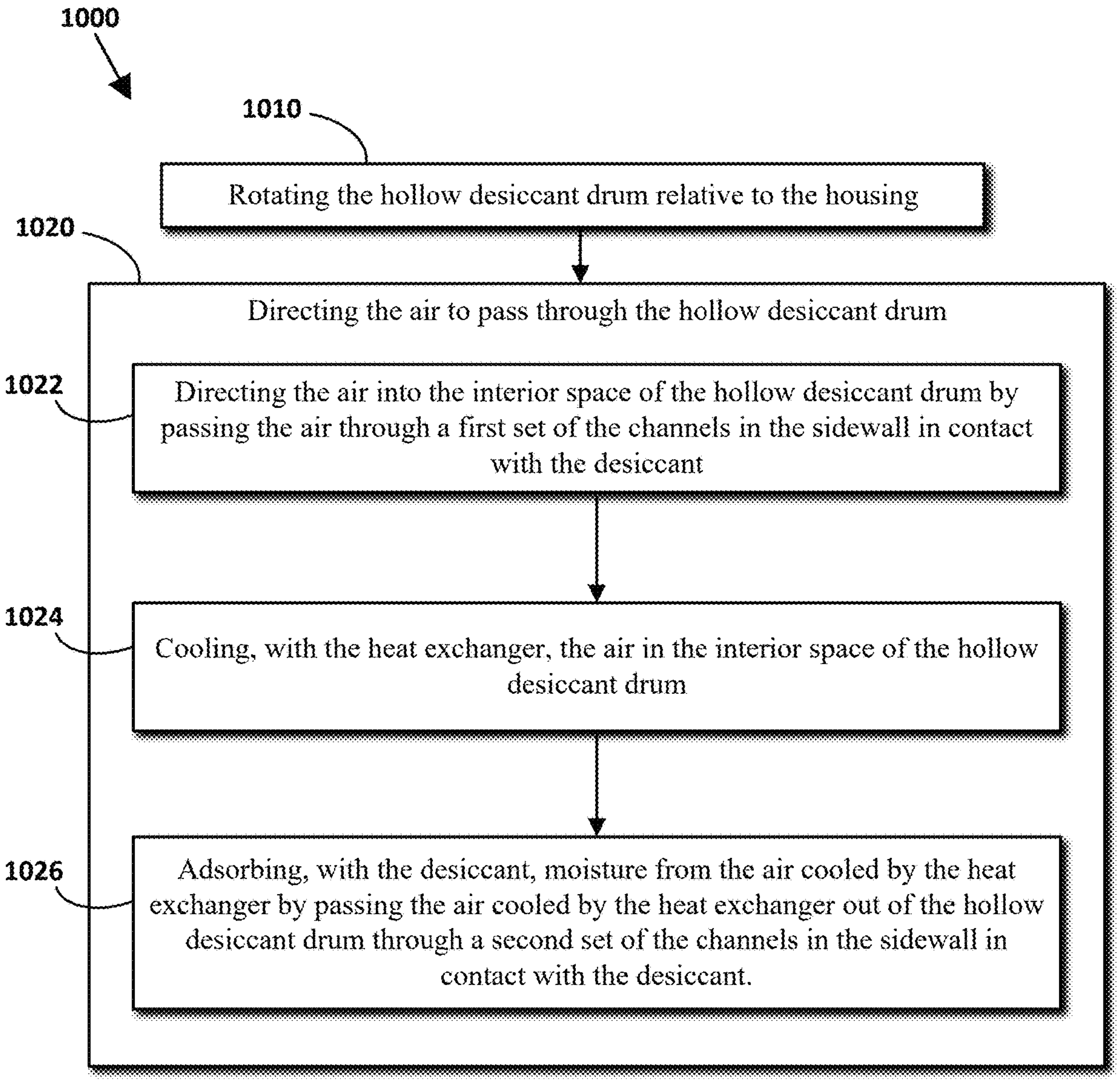
FIG. 5 is a block flow diagram for an embodiment of conditioning air in an HVACR system.

FIG. 5 is a block flow diagram of a method 1000 of conditioning air in an HVACR system. In an embodiment, the method 1000 may be used for controlling the HVACR system 101 in FIG. 2. For example, the method 1000 may be carried out by a controller of HVACR system 100 in FIG. 2 (e.g., HVACR controller, AHU controller, or the like). For example, the HVACR system includes an AHU (e.g., AHU 110) with a housing (e.g., housing 112), a hollow desiccant drum 140 (e.g., desiccant drum 140) disposed within the housing, and a cooling heat exchanger (e.g., cooling heat exchanger 130, evaporator 40).

At 1010, the hollow desiccant drum is rotated relative to the housing. The desiccant drum includes an interior space (e.g., interior space 144), a sidewall (e.g., sidewall 142) that surrounds the interior space, and channels (e.g., channels 146) that extend through the sidewall, and a desiccant provided in the channels. For example, one or more motor(s) (e.g., motors 170) may be used to rotate the hollow desiccant drum. The method 1000 then proceeds to 1020.

At 1020, the air (e.g., inlet air $F_I$) is directed to pass through the hollow desiccant drum. For example, one or more fans (e.g., fan 180) may be used to blow air through/within the housing of the AHU. Directing air through the hollow desiccant drum at 1020 includes 1022, 1024, and 1026.

At 1022, the air is directed to pass into the interior space of the hollow desiccant drum by passing the air through a first set of channels (e.g., channels in the first end 150A of the desiccant drum 140). in the sidewall of the desiccant drum. The air contacts the desiccant as it flows through the channels at 1020. The desiccant is regenerated by the air at 1022 by moisture in the desiccant being desorbed from the desiccant into the air as the air passes through the channels. The adsorbed moisture/water in the desiccant can also be at a lower temperature (e.g., at or about temperature $T_3$), such that the passing of the air through the first set of channels at 1022 also cools of the air. The method 1000 then proceeds from 1022 to 1024.

At 1024, the air in the interior space of the hollow desiccant drum is cooled by the cooling heat exchanger as the air flows through the interior space. In an embodiment, the heat exchanger is an evaporator in a refrigerant circuit (e.g., refrigerant circuit 5) and cools the air using the cooled working fluid in the refrigerant circuit. In an embodiment, the heat exchanger cools the air using an intermediate fluid cooled by the working fluid (e.g., process fluid $PF_2$). The method 1000 then proceeds from 1024 to 1026.

At 1026, the air cooled by the heat exchanger is passed out of the hollow desiccant drum through a second set of the channels in the sidewall (e.g., channels in the second side 150B of the desiccant drum 140). The air contacts the desiccant as it passes through the second set of channels, and the desiccant adorbs moisture from the air as it passes through the second set of channels. The material of the desiccant drum can also be at a higher temperature (e.g., at or about temperature $F_I$) then air cooled by the heat exchanger, such that the passing of the air through the second set of channels at 1026 also (slightly) heats the air.

In an embodiment, the method 1000 can be for operating the HVACR system and/or the AHU in a dehumidifying mode configured to dehumidify the air. In an embodiment, the method 1000 can be for operating the HVACR system and/or the AHU in a cooling and dehumidifying mode that is configured to cool and dehumidify the air. For example, the method 1000 may include operating the refrigerant circuit of the HVACR in a cooling mode that provides the relatively cooler working fluid or intermediate fluid to the cooler heat exchanger.

It should be appreciated that the method 1000 in an embodiment may include features as shown and/or discussed above for the refrigerant circuit 5 and HVACR system of FIG. 1 and/or the HVACR system 101 in FIG. 2.

Aspects

Any one of Aspects 1-8 may be combined with any of Aspects 9-18; and any one of Aspects 9-16 may be combined with any of Aspects 17-18.

Aspect 1. A dehumidifying air handling unit for an HVACR system comprising: a housing including an air inlet and an air outlet, a main airflow path extending through the housing from the air inlet to the air outlet; a hollow desiccant drum disposed in the main airflow path and configured to rotate within the housing, the hollow desiccant drum including an interior space, a sidewall that surrounds the interior space, and channels that extend through the sidewall, and a desiccant provided in the channels; and a heat exchanger disposed in the interior space of the desiccant drum, the heat exchanger configured to cool the air flowing through the interior space of the hollow desiccant drum.

Aspect 2. The dehumidifying air handling unit of Aspect 1, wherein the main airflow path extends through the sidewall of the hollow desiccant drum at least twice between the air inlet and the air outlet.

Aspect 3. The dehumidifying air handling unit of any one of Aspects 1 and 2, wherein the hollow desiccant drum and the heat exchanger are configured to dehumidify and cool the air in the main flow path as the air passes through the hollow desiccant drum.

Aspect 4. The dehumidifying air handling unit of any one of Aspects 1-3, wherein the desiccant is configured to adsorb moisture from the air flowing out of the hollow desiccant drum and to desorb the adsorbed moisture into the air flowing into the hollow desiccant drum.

Aspect 5. The dehumidifying air handling unit of any one of Aspects 1-4, wherein the sidewall has a tubular shape.

Aspect 6. The dehumidifying air handling unit of any one of Aspects 1-5, wherein the rotation of the hollow desiccant drum within the housing causes the channels to move between being located on a first end of the hollow desiccant drum and a second end of the hollow desiccant drum, the air configured to flow into the hollow desiccant drum through a set of the channels located on the first side of the hollow desiccant drum and to flow out of the hollow desiccant drum through a set of the channels located on the second side of the hollow desiccant drum.

Aspect 7. The dehumidifying air handling unit of any one of Aspects 1-6, wherein the main airflow path extends through the sidewall at least twice without turning more than 45 degrees.

Aspect 8. The dehumidifying air handling unit of any one of Aspects 1-7, wherein an axis of rotation of the hollow desiccant drum is at or about perpendicular to the main airflow path.

Aspect 9. A heating, ventilation, air conditioning, and refrigeration (HVACR) system comprising: a refrigeration circuit configured to cool a working fluid that includes refrigerant; and a dehumidifying air handling unit including: a housing including an air inlet and an air outlet, a main airflow path extending through the housing from the air inlet to the air outlet, a hollow desiccant drum disposed in main airflow path and configured to rotate within the housing, the hollow desiccant drum including an interior space, a sidewall that surrounds the interior space, channels that extend through the sidewall, and a desiccant provided in the channels, and a heat exchanger disposed in the interior space of the desiccant drum, the heat exchanger configured to cool the air flowing through the interior space of the hollow desiccant drum, wherein the heat exchanger uses the working fluid or an intermediate fluid cooled by the working fluid to cool the air.

Aspect 10. The HVACR system of Aspect 9, wherein the main airflow path extends through the sidewall of the hollow desiccant drum at least twice between the air inlet and the air outlet.

Aspect 11. The HVACR system of any one of Aspects 9 and 10, wherein the hollow desiccant drum and the heat exchanger are configured to dehumidify and cool the air in the main flow path as the air passes through the hollow desiccant drum.

Aspect 12. The HVACR system of any one of Aspects 9-11, wherein the desiccant is configured to adsorb moisture from the air flowing out of the hollow desiccant drum and to desorb the adsorbed moisture into the air flowing into the hollow desiccant drum.

Aspect 13. The HVACR system of any one of Aspects 9-12, wherein the sidewall has a tubular shape.

Aspect 14. The HVACR system of any one of Aspects 9-13, wherein the rotation of the hollow desiccant drum within the housing causes the channels to move between being located on a first end of the hollow desiccant drum and a second end of the hollow desiccant drum, the air configured to flow into the hollow desiccant drum through a set of the channels located on the first side of the hollow desiccant drum and to flow out of the hollow desiccant drum through a different set of the channels located on the second side of the hollow desiccant drum.

Aspect 15. The HVACR system of any one of Aspects 9-14, wherein the main airflow path extends through the sidewall at least twice without turning more than 45 degrees.

Aspect 16. The HVACR system of any one of Aspects 9-15, wherein an axis of rotation of the hollow desiccant drum is at or about perpendicular to the main airflow path.

Aspect 17. A method of conditioning air in a dehumidifying air handling unit, the dehumidifying air handling unit including a housing, a hollow desiccant drum disposed within the housing, and a heat exchanger disposed in an interior space of the desiccant drum, the method comprising: rotating the hollow desiccant drum relative to the housing, the hollow desiccant drum including the interior space, a sidewall that surrounds the interior space, channels that extend through the sidewall, and a desiccant provided in the channels, directing the air to pass through the hollow desiccant drum, which includes directing the air into the interior space of the hollow desiccant drum by passing the air through a first set of the channels in the sidewall in contact with the desiccant, cooling, with the heat exchanger, the air in the interior space of the hollow desiccant drum, adsorbing, with the desiccant, moisture from the air cooled by the heat exchanger by passing the air cooled by the heat exchanger out of the hollow desiccant drum through a second set of the channels in the sidewall in contact with the desiccant.

Aspect 18. The method of Aspect 17, wherein the passing of the air through the first set of the channels in the sidewall in contact with the desiccant includes desorbing the moisture adsorbed by the desiccant into the air passing through the first set of the channels.

The terminology used herein is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This Specification and the embodiments described are exemplary only, with the true scope and spirit of the disclosure being indicated by the claims that follow.

What is claimed is:

1. A dehumidifying air handling unit for a heating, ventilation, air conditioning, and refrigeration (HVACR) system comprising:

a housing including an air inlet and an air outlet, a main airflow path extending through the housing from the air inlet to the air outlet;

a hollow desiccant drum disposed in the main airflow path and configured to rotate within the housing, the hollow desiccant drum including an interior space, a sidewall that surrounds the interior space, and channels that extend through the sidewall, and a desiccant provided in the channels; and a heat exchanger disposed in the interior space of the desiccant drum, the heat exchanger configured to cool air in the main airflow path flowing through the interior space of the hollow desiccant drum.

2. The dehumidifying air handling unit of claim 1, wherein the main airflow path extends through the sidewall of the hollow desiccant drum at least twice between the air inlet and the air outlet.

3. The dehumidifying air handling unit of claim 1, wherein the hollow desiccant drum and the heat exchanger are configured to dehumidify and cool the air in the main airflow path as the air passes through the hollow desiccant drum.

4. The dehumidifying air handling unit of claim 1, wherein the desiccant is configured to adsorb moisture from the air in the main airflow path flowing out of the hollow desiccant drum and to desorb the adsorbed moisture into the air in the main airflow path flowing into the hollow desiccant drum.

5. The dehumidifying air handling unit of claim 1, wherein the sidewall has a tubular shape.

6. The dehumidifying air handling unit of claim 1, wherein rotation of the hollow desiccant drum within the housing causes the channels to move between being located on a first end of the hollow desiccant drum and a second end of the hollow desiccant drum, the air configured to flow into the hollow desiccant drum through a set of the channels located on the first end of the hollow desiccant drum and to flow out of the hollow desiccant drum through a set of the channels located on the second end of the hollow desiccant drum.

7. The dehumidifying air handling unit of claim 1, wherein the main airflow path extends through the sidewall at least twice without turning more than 45 degrees.

8. The dehumidifying air handling unit of claim 1, wherein an axis of rotation of the hollow desiccant drum is at or about perpendicular to the main airflow path.

9. A heating, ventilation, air conditioning, and refrigeration (HVACR) system comprising:

a refrigeration circuit configured to cool a working fluid that includes refrigerant; and a dehumidifying air handling unit including:

a housing including an air inlet and an air outlet, a main airflow path extending through the housing from the air inlet to the air outlet, a hollow desiccant drum disposed in the main airflow path and configured to rotate within the housing, the hollow desiccant drum including an interior space, a sidewall that surrounds the interior space, channels that extend through the sidewall, and a desiccant provided in the channels, and a heat exchanger disposed in the interior space of the desiccant drum, the heat exchanger configured to cool air flowing through the interior space of the hollow desiccant drum, wherein the heat exchanger uses the working fluid or an intermediate fluid cooled by the working fluid to cool the air.

10. The HVACR system of claim 9, wherein the main airflow path extends through the sidewall of the hollow desiccant drum at least twice between the air inlet and the air outlet.

11. The HVACR system of claim 9, wherein the hollow desiccant drum and the heat exchanger are configured to dehumidify and cool the air in the main airflow path as the air passes through the hollow desiccant drum.

12. The HVACR system of claim 9, wherein the desiccant is configured to adsorb moisture from the air flowing out of the hollow desiccant drum and to desorb the adsorbed moisture into the air flowing into the hollow desiccant drum.

13. The HVACR system of claim 9, wherein the sidewall has a tubular shape.

14. The HVACR system of claim 9, wherein rotation of the hollow desiccant drum within the housing causes the channels to move between being located on a first end of the hollow desiccant drum and a second end of the hollow desiccant drum, the air configured to flow into the hollow desiccant drum through a set of the channels located on the first end of the hollow desiccant drum and to flow out of the hollow desiccant drum through a different set of the channels located on the second end of the hollow desiccant drum.

15. The HVACR system of claim 9, wherein the main airflow path extends through the sidewall at least twice without turning more than 45 degrees.

16. The HVACR system of claim 9, wherein an axis of rotation of the hollow desiccant drum is at or about perpendicular to the main airflow path.

17. A method of conditioning air in a dehumidifying air handling unit, the dehumidifying air handling unit including a housing, a hollow desiccant drum disposed within the housing, and a heat exchanger disposed in an interior space of the desiccant drum, the method comprising:

rotating the hollow desiccant drum relative to the housing, the hollow desiccant drum including the interior space, a sidewall that surrounds the interior space, channels that extend through the sidewall, and a desiccant provided in the channels, directing the air to pass through the hollow desiccant drum, which includes:

directing the air into the interior space of the hollow desiccant drum by passing the air through a first set of the channels in the sidewall in contact with the desiccant, cooling, with the heat exchanger, the air in the interior space of the hollow desiccant drum, and adsorbing, with the desiccant, moisture from the air cooled by the heat exchanger by passing the air cooled by the heat exchanger out of the hollow desiccant drum through a second set of the channels in the sidewall in contact with the desiccant.

18. The method of claim 17, wherein the passing of the air through the first set of the channels in the sidewall in contact with the desiccant includes desorbing the moisture adsorbed by the desiccant into the air passing through the first set of the channels.

* * * * *